(12) United States Patent
Gaspari

(10) Patent No.: US 8,488,114 B2
(45) Date of Patent: Jul. 16, 2013

(54) METHOD AND SYSTEM FOR FIBER-OPTIC MONITORING OF SPATIALLY DISTRIBUTED COMPONENTS

(75) Inventor: Roberto Gaspari, Milan (IT)

(73) Assignee: Prysmian S.p.A., Milan (IT)

( * ) Notice: Subject to any disclaimer, the term of this patent is extended or adjusted under 35 U.S.C. 154(b) by 385 days.

(21) Appl. No.: 12/744,156

(22) PCT Filed: Nov. 29, 2007

(86) PCT No.: PCT/EP2007/063002
§ 371 (c)(1),
(2), (4) Date: Sep. 8, 2010

(87) PCT Pub. No.: WO2009/068094
PCT Pub. Date: Jun. 4, 2009

(65) Prior Publication Data
US 2010/0328651 A1    Dec. 30, 2010

(51) Int. Cl.
*G01N 21/00* (2006.01)
*G02B 6/00* (2006.01)
*G01R 31/00* (2006.01)
*H04B 10/00* (2006.01)

(52) U.S. Cl.
USPC .......... 356/73.1; 398/110; 398/113; 398/170; 385/12; 324/96

(58) Field of Classification Search
None
See application file for complete search history.

(56) References Cited

U.S. PATENT DOCUMENTS

| | | | |
|---|---|---|---|
| 4,870,269 | A | 9/1989 | Jeunhomme et al. |
| 5,035,511 | A | 7/1991 | Berthold |
| 2004/0240769 | A1 | 12/2004 | Spirin et al. |
| 2010/0092182 | A1* | 4/2010 | Sarchi et al. ................. 398/168 |

FOREIGN PATENT DOCUMENTS

| | | |
|---|---|---|
| DE | 43 32 501 A1 | 3/1995 |
| JP | 3-231116 | 10/1991 |
| JP | 4-92523 | 3/1992 |
| JP | 2004-309219 | 11/2004 |
| WO | WO 97/36150 | 10/1997 |

OTHER PUBLICATIONS

International Search Report from the European Patent Office for International Application No. PCT/EP2007/063002, mailed Jul. 25, 2008.

* cited by examiner

*Primary Examiner* — Gordon Stock, Jr.
(74) *Attorney, Agent, or Firm* — Finnegan, Henderson, Farabow, Garrett & Dunner, L.L.P.

(57) ABSTRACT

A system for monitoring a plurality of components distributed in different space locations, includes: at least one optical fiber path; an optical radiation source adapted to inject optical radiation into the at least one optical fiber path; at least one first and at least one second optical branches branching from the at least one optical fiber path and adapted to spill respective portions of the optical radiation, the first and second optical branches being adapted to be operatively associated with a respective component to be monitored. The first optical branch includes a first optical reflector and is adapted to reflect the spilled optical radiation portion unless the respective component at least partially breaks; the second optical branch includes at least one passive optical attenuator adapted to be operatively coupled to the respective component to be monitored, and having an attenuation capable of changing in response to a change in operating conditions of the respective monitored component when operatively coupled thereto, and a second optical reflector. An optical receiver is adapted to detect back-reflected optical radiation reflected by the first and second optical branches. The monitoring system is adapted to recognize a position of a component of the plurality of components based on a characteristic of the back-reflected optical radiation.

18 Claims, 8 Drawing Sheets

METHOD AND SYSTEM FOR FIBER-OPTIC MONITORING OF SPATIALLY DISTRIBUTED COMPONENTS

CROSS REFERENCE TO RELATED APPLICATION

This application is a national phase application based on PCT/EP2007/063002, filed Nov. 29, 2007, the content of which is incorporated herein by reference.

BACKGROUND OF THE INVENTION

1. Field of the Invention

The present invention relates in general to methods and systems for monitoring the state of components distributed in a plurality of spatial locations, particularly, although not limitatively, electric power distribution system components. In particular, the present invention concerns the monitoring, in real time and by exploiting optical fibers, of the state and condition of components such as "ancillary" elements of electric power distribution networks, for example elements used for ensuring the system security.

2. Description of Related Art

Distribution systems of electric power comprise distribution networks, for example high voltage (HV) distribution networks.

The term "high voltage" is related to voltages higher than 35 kV, reaching also one or more hundreds of kilovolts.

The distribution networks make use of cables that may, for example, be aerial (overhead) or underground, for example positioned in tunnels.

In addition to cables, electric power distribution networks can comprise a number of different ancillary elements that, strictly speaking, do not play a direct role in the electric power distribution, being instead used to guarantee proper conditions of usage and security of the distribution line.

Examples of ancillary elements are Surge Voltage Limiters (SVLs), also known as Surge Arresters (SAs) or surge suppressors, oil pressure monitoring systems for oil-filled cables, thermometers to check the pumps for circulating cooling water and the cooling water temperature itself.

The environment where the cables are located can be critical because recessed and/or dangerous, like in the case of HV networks. Thus, the monitoring and the maintenance of the ancillary elements of an electric power distribution cable may be cumbersome, and cannot be carried out on a frequent time basis. Even when the ancillary elements are not enclosed in protective boxes, the monitoring of their operating conditions can imply long inspection time and/or the interruption of the distribution of the electric power.

This is indeed strongly undesired because an electric power distribution line normally supplies a very large area and a substantial number of users who are never ready to accept a service interruption.

There is therefore the need of devising a solution to the problem of monitoring the proper operation of ancillary elements such as SVLs, oil pressure monitoring systems, thermometers and so on, with the aim of being able to replace them as readily as possible when they break.

In the published Japanese patent application JP 04-092523, a detecting sensor for contact information is described to detect the contact information with no mechanical force applied. Light shading mechanisms are provided and operate by the contact information between optical branches devices and mirrors provided at plural areas of an optical fiber.

The Applicant observed that said shading mechanisms are of the active type, i.e. they require an outer energy source to operate. Particularly, in the examples an electric power supply is provided. No application to power cables is envisaged.

In the published Japanese patent application JP 2004309219, a sensor measuring system is disclosed, comprising a plurality of fiber measuring sensors for measuring a number of physical quantities.

The Applicant observed that the sensors are positioned in series on a main optical fiber, not on the branching thereof, therefore intensity reduction in one of them lessens the amount of light available in the following sensors, thereby reducing the measurement dynamics.

In the published Japanese patent application JP 03-231116, an optical fiber sensor is disclosed wherein fiber end faces of multiple branched optical fibers are inserted into oil and pulse light is inputted from a reflection measuring device like an Optical Time Domain Reflectometer (OTDR); Fresnel reflection at the fiber end is therefore attenuated and thus the event detected.

The published U.S. patent application 2004/0240769 describes an alarm condition distributed fiber optic sensor with storage transmission-reflection analyzer. The Applicant observed that both transmission and reflection detectors are electrically connected to the storage transmission-reflection analyzer.

The U.S. Pat. No. 5,035,511 describes a distributed fiber optic temperature sensor based on time domain transmission. Light is transmitted through the sensor only one time and not reflected back.

SUMMARY OF THE INVENTION

The Applicant has faced the problem of monitoring the change of a physical quantity (e.g. temperature, magnetic effect) in a set of components distributed in different spatial locations, particularly, albeit not limitatively, a set of ancillary elements (e.g., surge arresters) distributed in different positions along an electric power distribution network.

Generally, the components to be monitored (e.g. high voltage and/or recessed power cables) are located in critical environments which imply the fulfillment of a number of requirements, for instance:
 the monitoring system should be passive;
 the position (and, possibly, the time) of the occurrence of the change of a physical quantity should be remotely identified, with no need of direct inspections which are often difficult or even impossible to be carried out;
 the monitoring system should be able to recognize and identify multiple changes of a physical quantity occurring substantially at the same time in different positions;
 preferably, the monitoring system should be able to recognize and identify changes of a physical quantity irrespective from the duration thereof (the system reaction should be faster than the monitored event duration).

The Applicant has noticed that these requirements can be fulfilled by providing a monitoring system in which the component to be monitored is operatively associated with an optical branch branching from an optical fiber path. In detail, a passive optical attenuator is inserted in the optical branch and is operatively coupled to the component to be monitored, the passive optical attenuator having an attenuation capable of changing in response to a change in operating conditions of the monitored component (e.g. a change of the temperature of the monitored component). Furthermore, the monitoring system comprises an optical reflector which is positioned downstream the optical attenuator.

The Applicant has noticed that some kinds of events, when occurring on the monitored component, can cause a physical deformation thereof. A typical and common example of said kinds of events is the break of the monitored component.

Generally, such kinds of events are difficult to be detected. In fact; even though they may indeed produce a break of the optical fiber in the optical branch provided with the optical attenuator, the Applicant has noticed that the broken optical fiber may or may not reflect at the breakage point, depending on the critical break angle which forms when the event occurs. Therefore, it might be difficult to assess whether the monitored component is broken or not.

The Applicant has perceived the need of providing a monitoring system which is suitable to reliably and easily detect also those kinds of events which cause a physical deformation of the monitored component, e.g a break thereof.

The Applicant has found that these kinds of events can be advantageously detected by operatively associating to the component to be monitored an additional optical branch branching from the optical fiber path, said additional optical branch comprising a further optical reflector which is suitable to reflect the optical radiation unless the monitored component breaks.

The provision of this additional, normally reflective optical branch—which becomes non-reflective when the monitored component breaks—allows the monitoring system to detect also said kinds of events, such as the break of the monitored component, thereby contributing in advantageously and remarkably increasing the reliability of the monitoring system.

According to an aspect thereof, the present invention relates to a monitoring system for monitoring a plurality of components distributed in different space locations, particularly albeit not limitatively ancillary elements of an electric power distribution network; the monitoring system comprises:

at least one optical fiber path;
an optical radiation source adapted to inject an optical radiation into the at least one optical fiber path;
at least one first and at least one second optical branches branching from the at least one optical fiber path and adapted to spill respective portions of said optical radiation, the first and second optical branches being adapted to be operatively associated with a respective component to be monitored, wherein:
the first optical branch comprises a first optical reflector adapted to reflect the spilled optical radiation portion, unless the respective component at least partially breaks;
the second optical branch comprises:
at least one passive optical attenuator adapted to be operatively coupled to the respective component to be monitored, and having an attenuation capable of changing in response to a change in operating conditions of the respective monitored component when operatively coupled thereto, and
a second optical reflector;
an optical receiver adapted to detect back-reflected optical radiation reflected by said first and second optical branches.

In the present description and claims, the term "passive" is intended for a device or component not requiring a dedicated energy source for performing the intended function. Such a device or component can be activated by a physical phenomenon generated by, e.g., a surge (transient sudden rise of current or voltage in an electrical circuit) or fault or disturbance, with no need of other power feeding devices, e.g. battery. In particular, neither electrical energy nor mechanical energy is needed. Indeed, the presence of local feeding devices for the monitoring device or component could give rise to the same problems and troubles set for the above in connection with the ancillary elements.

For the purpose of the present description and claims:
by "optical source" it is intended a source of optical radiation adapted to propagate through an optical fiber; examples of optical sources are lasers and OTDR apparatuses;
by "optical receiver" it is meant a device detecting an optical signal, converting it into an electrical signal, and processing the electrical signal as required for further use; examples of optical receivers are OTDR apparatuses and Optical Spectrum Analyzers (OSAs);
by "optical attenuator" it is intended a device adapted to alter the intensity of an optical radiation transmitted through an optical fiber; a special case of optical attenuator is an optical shutter, which is a device adapted to either substantially stop the optical radiation or let the optical radiation pass through; for the purposes of the present invention, such a device is activated by an external physical phenomenon related to the physical quantity, the change of which is monitored;
by "splitter" or "directional coupler" it is meant an optical coupling device for separately coupling or splitting optical signals (in a known coupling loss) in a transmission line;
by "coupling" it is meant the transfer of energy from one optical fiber to another or a branch thereof in a splitter;
by "Fresnel reflection" it is intended the reflection of optical radiation predicted by the Fresnel equations describing the behavior of light when moving through media of differing refractive indices; for common glass, the reflection coefficient is about 4%; such a reflection occurs, as an example, at the end of an optical fiber (either cleaved or broken) when the angle between the fiber axis (corresponding to the direction of propagation of the photons within the fiber) and the fiber end surface is lower than the optical critical angle. When light moves from a dense to a less dense medium, such as from glass to air, light is reflected in the incident medium, an effect known as internal reflection. Before the light ray totally internally reflects, the light refracts at the critical angle; it travels directly along the surface between the two refractive media, without a change in phases like in other forms of optical phenomena;
by "reflector", it is meant a device adapted to send a portion of optical radiation back to where it came from (like a mirror); an example of reflector is a surface resulting from a cut substantially perpendicular) (80-90° to the longitudinal axis of an optical fiber, said surface being optionally covered by a reflecting material, e.g. gold; typically the reflector is part of a reflective pigtail (a pigtail is a terminal segment of an optical fiber having a free, unconnected end); another example of reflector is a fiber grating;
by "back-reflected optical radiation" it is intended the portion of optical radiation that, after having been reflected by the reflector, propagates back towards the optical receiver; the back-reflected optical radiation has characteristics that are typical of an optical radiation, and characteristics that may be imparted to the optical radiation by the optical attenuator and/or the reflector; examples of characteristics of the back-reflected optical radiation are: the intensity (as a function of time), the polarization state, the wavelength, the radiation spectrum, the frequency of switching between two discrete values of intensity, the propagation delay from where the back-reflected reflected optical radiation is reflected back to the optical receiver.

In particular, the first optical branch may comprise a length of optical fiber adapted to be attached to, e.g. wrapped around, the respective component to be monitored.

The optical attenuator in the second optical branch may be adapted to be attached to a respective component to be monitored.

Components to be monitored may, as mentioned, include ancillary elements of electric power distribution lines; in particular, ancillary elements to be monitored may include at least one element selected from the group consisting of: surge voltage limiters, thermometers, pressure monitors. Preferably the ancillary elements are surge voltage limiters.

The passive optical attenuator may be responsive to a current flowing through the ancillary element operatively coupled thereto.

In particular, the passive optical attenuator may be thermally coupled to the respective ancillary component.

The passive optical attenuator may have an attenuation varying with temperature, in such a way that a temperature increase caused by current flowing through the ancillary element operatively associated therewith causes a change in the attenuation value.

Preferably, a fraction of the optical radiation that is spilled by each optical branch varies monotonically, particularly decreases along the optical fiber path.

The monitoring system is preferably adapted to recognize the position of the monitored components by means of the optical receiver.

According to another aspect thereof, the present invention relates to a method for monitoring a plurality of components distributed in different space locations, the method comprising:
providing at least one optical fiber path;
associating each of the components to be monitored to respective at least one first and second optical branches branching from the at least one optical fiber path, adapted to spill respective portions of an optical radiation propagating through the at least one optical path, wherein the first optical branch is adapted to reflect the spilled optical radiation portion unless the respective component at least partially breaks;
propagating the optical radiation into the optical fiber path;
operatively coupling at least one passive optical attenuator to each one of the components to be monitored, the passive optical attenuator being part of the second optical branch associated with the respective component;
responsive to a change in operating condition of at least one of the components to be monitored, causing a spilled optical radiation propagating through the second optical branch associated with said component to be back-reflected;
detecting the back-reflected optical radiation; and
recognizing a position of said at least one of the components based on a characteristic of the detected back-reflected optical radiation.

Said associating each of the components to be monitored to a respective at least one first optical branch may comprise the step of attaching a length of optical fiber to the component to be monitored, for example by wrapping the length of optical fiber around the component to be monitored.

Preferably, the step of operatively coupling at least one passive optical attenuator to each of the components to be monitored comprises the step of attaching the passive optical attenuator to the respective component to be monitored.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

BRIEF DESCRIPTION OF THE DRAWINGS

The features and advantages of the present invention will be made apparent by reading the following description of some embodiments thereof, provided by way of exemplary and non-limitative examples, description that is referred to the annexed drawings, wherein.

DETAILED DESCRIPTION OF THE PREFERRED EMBODIMENTS

Figure 1:
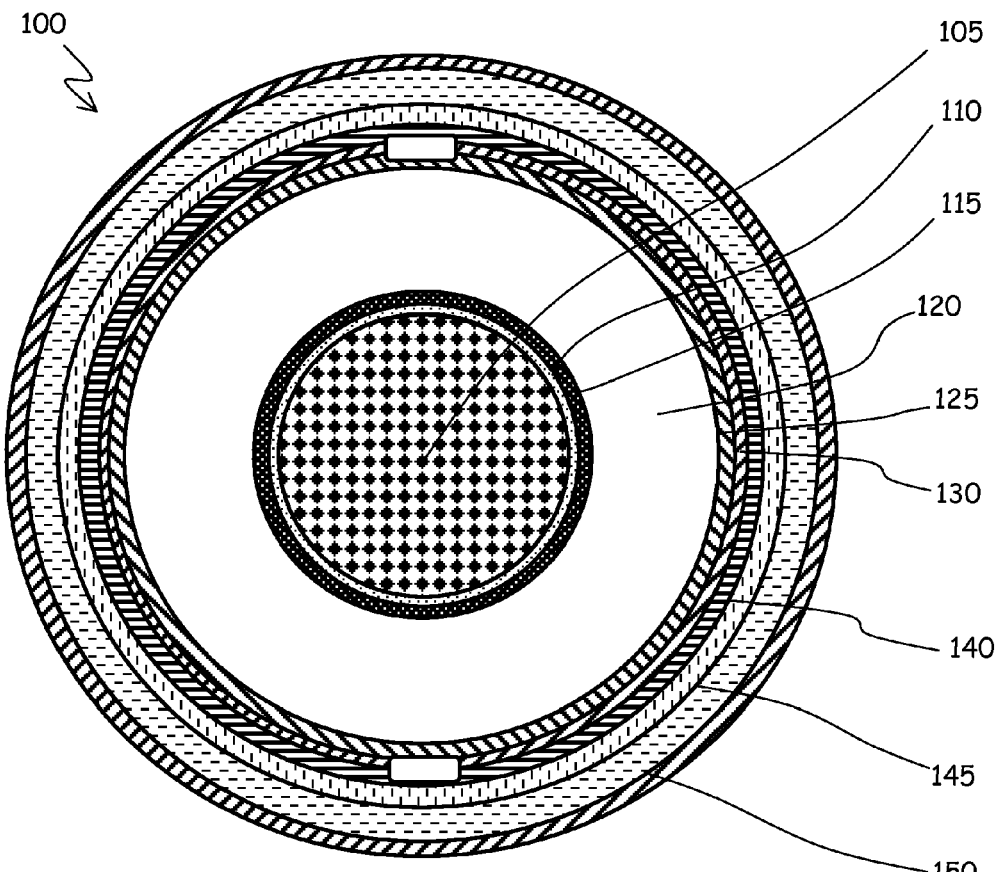
FIG. 1 shows, in cross section, a cable used in HV electric power distribution systems, a scenario where the present invention can be usefully applied.

FIG. 1 shows, in cross section, a cable 100 for HV electric power distribution networks, particularly a single-core cable. The cable 100 comprises, starting from the center thereof and moving radially outwards, a central conductor 105, a binder 110, made of a semi-conductive tape, a conductor screen 115, made of a semi-conductive polymer, an insulation layer 120 made, for example, of cross-linked polyethylene (XLPE), an insulation screen 125, made of a semi-conductive polymer, a semi-conductive water barrier 130, made for example of a semi-conductive hygroscopic tape, a metallic sheath 140, made of a metal sheet, a jacket 145 of high-density polyethylene (HDPE), and finally a protective coating 150. The cable 100 can be used both in aerial applications or underground.

The metallic sheath 140 has primarily the function of making the electromagnetic field uniform around the conductor 105.

Phenomena like lightning, switch-on maneuvers of the electric power distribution network, line-to-line ground faults, load rejection, ferroresonance, just to cite a few, can cause a voltage rise in the metallic sheath to unacceptably high values, e.g. higher than 1 KV. In order to protect the cable 100 from detrimental over-voltages (surges), ancillary elements, particularly SVLs, are used.

Figure 2:
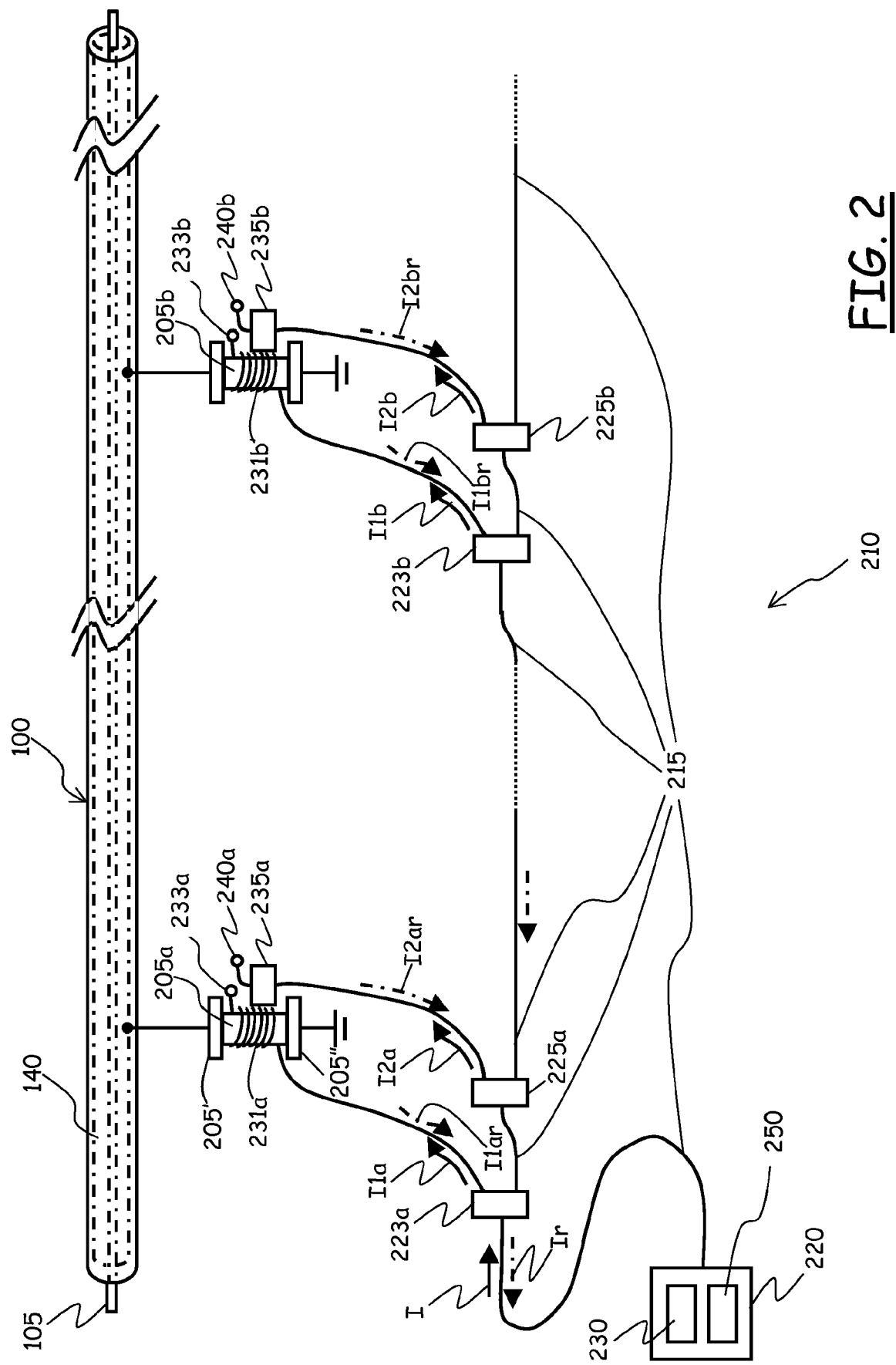
FIG. 2 schematically shows a monitoring system according to an embodiment of the present invention, applied to an electric power distribution system for monitoring the SVLs protecting it.

Typically, a plurality of SVLs is coupled to an electric power distribution cable like cable 100, the SVLs being distributed approximately every 500 m along the cable. FIG. 2 schematically shows a segment of the cable 100, intended to distribute one of the three phases of a triphase HV electric power distribution line, with associated a plurality of SVLs, like the SVLs 205a and 205b shown in the drawing, positioned at a distance from each other along the cable 100, for example at intervals of approximately 500 m (only two SVLs are shown in the drawing, for avoid unnecessary complication; however several SVLs are typically distributed along the cable). Each SVL has a first end 205' electrically connected to the cable metallic sheath 140, and a second end 205" electrically connected to earth.

The SVL is an ancillary element implementing a highly non-linear resistor, and, for applications requiring high power dissipation, like in HV electric power distribution systems, it comprises a plurality of metal-oxide discs that are arranged in columns between said first and second ends, inside a non-metallic housing. An example of SVL suitable for the present invention is MW08 marketed by ABB.

In case the voltage of the metallic sheath 140 raises over the intervention threshold of the SVL (designed to keep the metallic sheath voltage below a few kilovolts), the SVL becomes conductive, and thus, for a brief transient (of the order of few microseconds), it shorts the cable metallic sheath to earth, limiting the sheath voltage to acceptable values. In normal conditions (i.e., when an SVL operates properly), no current flows therethrough, apart during discharges, when the cable experiences overvoltages; thus, normally there is no current circulating along the metallic sheath 140.

SVLs are reliable components. However, a discharge running across the metal-oxide discs causes a partial sinterization of the discs material, said sinterization being directly related to the discharged energy. The sinterized material looses part of its electrical characteristics.

Each SVL can thus withstand a limited number of discharges (nominally and on average, each SVL can survive without damages about eight-ten typical switching surge discharges). As mentioned above, in normal conditions (i.e., when an SVL operates properly) no current flows therethrough, apart during discharges, when the cable metallic sheath experiences over-voltages. However, when the discharged accumulated energy is sufficiently high, a conductive path is formed across the metal-oxide discs, and the SVL breaks, becoming conductive and thus loosing its protection capabilities.

An out of order SVL causes the establishment of a conductive current path to earth, and thus enables the circulation of currents that unacceptably increase the overall circuit losses. In certain cases, the broken SVL could also blow up, possibly causing damages to the cable and to the surroundings.

For this reason, damaged or out of order SVLs should be replaced as soon as possible, and for this purpose a regular inspection of the SVLs installed on an electric power distribution line should be carried out to ensure that these elements operate properly, and, when a damaged or out of order SVL is detected, it is immediately replaced.

Unfortunately, SVLs are often not easily accessible, or even totally inaccessible to humans, because they are normally installed in protective link boxes, being connected to the (metallic sheath of the) cables by means of dedicated sub-lines; these boxes are usually sealed and bolted, and the cables themselves are not easily accessible. This is rather common in recessed distribution networks.

Referring to FIG. 2, there is schematically shown a monitoring system according to an embodiment of the present invention, adapted to allow the remote monitoring of the state of the SVLs used to protect the cable 100, without the need of on-field inspection.

The monitoring system, denoted globally as 210, is a passive, optical-based system, comprising an optical fiber 215 that, starting from a central monitoring unit 220, runs along the cable 100.

In correspondence of each SVL 205a, 205b, first and second optical splitters 223a and 225a, 223b and 225b, respectively, are provided along the optical fiber 215. The optical splitters 223a and 225a, 223b and 225b are designed to spill a respective, selected fraction I1a and I2a, I1b and I2b of the optical power of an optical radiation they receive in input, in particular a fraction of the optical power I of an optical radiation which is injected into the optical fiber 215 by an optical source 230, for example a laser source, of the central monitoring unit 220, and which propagates through the optical fiber 215.

The fraction I1a, I1b of optical radiation spilled by the first optical splitter 223a, 223b associated with the SVL 205a, 205b is fed to a respective first optical branch associated with that SVL; the first optical branch comprises a length 231a, 231b of optical fiber which is mechanically coupled (attached) to the respective SVL 205a, 205b, and which terminates with a first reflector 233a, 233b. Preferably, the length 231a, 231b of optical fiber of the first optical branch is wound or wrapped around the respective SVL 205a, 205b.

The fraction I2a, I2b of optical radiation spilled by the second optical splitter 225a, 225b associated, respectively, with the SVL 205a, 205b is fed to a respective second optical branch associated with that SVL; the second optical branch comprises an optical attenuator 235a, 235b and, downstream the optical attenuator 235a, 235b, a second reflector 240a, 240b. When the optical attenuator 235a, 235b is closed (i.e., it is in a first, high attenuation state), it blocks the propagation of the optical radiation fractions spilled by the associated second optical splitters 225a, 225b, preventing the reflection of said radiation by the second reflectors 240a, 240b. The optical attenuators 235a, 235b may be low back-reflection optical shutters. When the optical attenuator 235a, 235b is open (i.e., it is in a second, low attenuation state), it allows the propagation of the optical radiation fractions spilled by the associated second optical splitter 225a, 225b; the spilled optical radiation fractions can thus reach the second reflector 240a, 240b, and be reflected back by it. An example of optical attenuator suitable for the present invention is the In-Line Optical Fiber Shutter marketed by Phoenix Photonics.

The optical attenuator 235a, 235b is operatively coupled to the respective SVL 205a, 205b in such a way as to be responsive to a change in a physical quantity associated with the SVL. The coupling can be thermal, electrical, magnetic or mechanical, or a combination thereof.

In particular, the optical attenuator 235a, 235b is operatively coupled to the respective SVL 205a, 205b in such a way that an operating condition of the SVL 205a, 205b to be monitored, for example the passage of a current through the SVL, induces a change in the state of the associated optical attenuator 235a, 235b. For example, the optical attenuator 235a, 235b may be a normally-open optical shutter, that normally (i.e., when no current, or a current below a predetermined threshold, flows through the associated SVL) blocks the optical radiation fed thereto, preventing it from reaching the second reflector 240a, 240b and being reflected; the passage of a current (greater than the predetermined threshold) through the SVL 205a, 205b causes the optical attenuator 235*a*, 235*b* to close, so that the fraction of optical radiation I2*a*, I2*b* spilled by the respective second optical splitter 225*a*, 225*b* passes through the optical attenuator and reaches the second reflector 240*a*, 240*b*, where the optical radiation is back-reflected.

The first and second reflectors 233*a* and 240*a*, 233*b* and 240*b* are designed to reflect, e.g. by Fresnel reflection, the incident fraction of optical radiation I1*a* and I2*a*, I1*b* and I2*b*. In particular, the first and second reflectors 233*a* and 240*a*, 233*b* and 240*b* may be mirror surfaces, obtained by cutting an optical fiber substantially orthogonally (at an angle of 90°±3°) to its longitudinal axis, and, optionally, by advantageously coating the surface thus obtained with a reflecting material, such as dielectric layers or gold. In the case of the presence of a reflecting material, that cut can have a more oblique angle as known to the skilled in the art, for example of 90°±10°. The first or second reflector 233*a* or 240*a*, 233*b* or 240*b* may be part of a reflective pigtail.

The optical splitter 223*a*, 225*a*, 223*b*, 225*b* may be an all-fiber device made by coupling two optical fibers, one being the optical fiber 215 that continues along the cable 100, the other being the optical fiber forming the first or the second optical branch associated with the SVL to be monitored. The two optical fibers are optically coupled to one another for a certain length; this kind of optical splitter, which has the advantage of being an all fiber device (completely made of optical fibers), works also as an optical coupler, being adapted to re-inject the back-reflected optical radiation I1*ar*, I2*ar*, I1*br*, I2*br* into the optical fiber 215. As an alternative, micro-optics splitters can be used, with lenses that spill optical radiation from the fiber 215, and partially-reflecting mirrors for re-injecting the back-reflected optical radiation into the fiber.

The central monitoring unit 220 also includes an optical receiver 250, optically coupled to the optical fiber 215 so as to receive and be able to detect a back-reflected optical radiation Ir that propagates along the optical fiber 215 in the direction opposite to the injected optical radiation I. In particular, the optical receiver 250 can comprise an opto-electrical conversion part that is adapted to convert the detected optical radiation Ir into electrical signals, and a signal processing part, adapted to process the electrical signals resulting from the conversion of the detected back-reflected optical radiation Ir.

The optical receiver 250 may be an OTDR apparatus or an OSA, as discussed in greater detail later on.

The monitoring system 210 of this embodiment of the present invention operates in the following way.

The optical source 230 of the central monitoring unit 220 injects into the fiber 215 an optical radiation I, at a selected wavelength; the injected optical radiation I propagates through the fiber 215 and, when it reaches the first optical splitter associated with a corresponding SVL, like for example the first optical splitter 223*a* in correspondence to the SVL 205*a*, a selected fraction I1*a* of the optical radiation I is spilled and fed to the first optical branch associated with that SVL; the remaining part of the optical radiation continues to propagate through the fiber 215, to reach the second optical splitter 225*a* associated with the SVL 205*a*; here, a selected fraction I2*a* of the optical radiation is spilled and fed to the second optical branch, while the remaining part of the optical radiation continues to propagate along the fiber 215. The same occurs at each SVL positioned along the cable length.

Considering one of the SVLs, e.g. the SVL 205*a*, in normal conditions (when the SVL operates properly and it is not discharging an over-voltage of the metallic sheath 140 of the cable 100), the first optical branch associated therewith is closed, i.e. it lets the spilled fraction I1*a* of optical radiation to pass, reach the first reflector 233*a* and be reflected back towards the first optical splitter 223*a* (in FIG. 2, the back-reflected optical radiation is denoted I1*ar*; I1*br* denotes the back-reflected optical radiation for the SVL 205*b*). The second optical branch associated with the SVL 205*a* is open in normal conditions (because the optical shutter 235*a* is normally open), i.e. it blocks the spilled fraction I2*a* of optical radiation, preventing it from reaching the reflector 240*a*.

In particular, as long as the considered SVL 205*a* is not damaged and does not conduct current (because the metallic sheath 140 of the cable 100 does not experience an over-voltage), the spilled fraction of optical radiation I1*a* in the first optical branch reaches the first reflector 233*a*, where it is reflected back as a back-reflected optical radiation fraction I1*ar* towards the first optical splitter 223*a*, which injects the back-reflected optical radiation I1*ar* into the optical fiber 215. The optical shutter 235*a* associated with the SVL 205*a* remains in the open state, so that the spilled fraction of optical radiation I2*a* is blocked and no significant back-reflection takes place in the second optical branch. The back-reflected optical radiation I1*ar* propagates through the optical fiber 215 back to the central monitoring unit 220, where it is received and detected by the optical receiver 250.

Figure 3A:
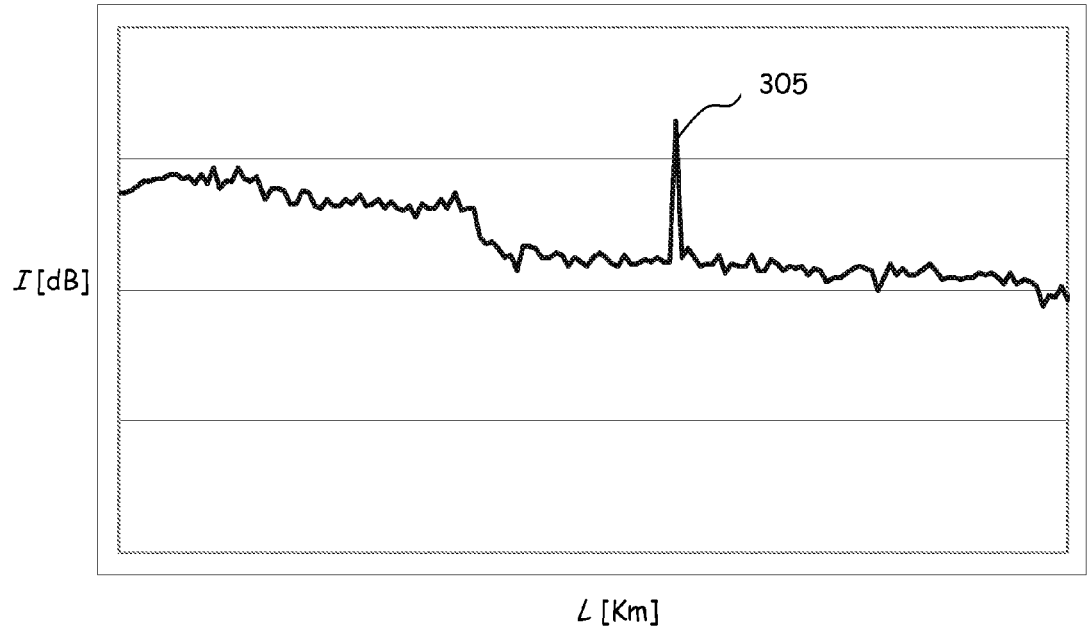
FIGS. 3A-3D are diagrams of different patterns of back-reflected optical radiations that can be detected by an optical receiver of the monitoring system of FIG. 2, adapted to identify different change of states of a monitored component.

An example of a possible optical radiation reflection pattern (reflected optical radiation intensity I, in dB, in ordinate, versus distance L along the optical fiber 215, in Km, in abscissa) detected by the monitoring unit 220 in the condition mentioned above is depicted in FIG. 3A where a peak 305 in the optical radiation reflection pattern is visible, at a position, along the optical fiber 215, that corresponds to the location of the SVL 205*a* along the cable 100. When such an optical radiation reflection pattern is detected, the SVL 205*a* is assessed to operate properly, and no current discharge event is taking place.

On the contrary, when the SVL 205*a* conducts a current, for example because the SVL is discharging an over-voltage of the metallic sheath 140 of the cable 100 (in this case the SVL becomes conductive for a short transient, and a current burst flows therethrough, then the SVL returns to its non-conductive state), the rise in the SVL temperature due to the current flowing therethrough causes the optical shutter 235*a* to switch to its closed state; the spilled optical radiation fraction I2*a* can thus propagate through the second optical branch and reach the second reflector 240*a*; here, a non-negligible part I2*ar* of the spilled fraction of optical radiation is reflected back towards the second optical splitter 225*a*, which injects the back-reflected optical radiation into the optical fiber 215. Provided that the SVL 205 is not damaged or broken by the current burst flowing therethrough, the first optical branch (particularly, the length of optical fiber wound around the SVL 205*a*) is also not damaged, and continues to allow the spilled optical radiation fraction I1*a* reaching the first reflector 233*a*, where it is reflected back as a back-reflected optical radiation fraction I1*ar*. In detail, the first optical splitter 223*a* injects the back-reflected optical radiation I1*ar* into the optical fiber 215. The back-reflected optical radiation that propagates back through the optical fiber 215 is the combination of two contributions, one represented by the back-reflected optical radiation I1*ar* and the other represented by the back-reflected optical radiation I2*ar*. The back-reflected optical radiation propagates back to the central monitoring unit 220, where it is received and detected by the optical receiver 250.

Figure 3B:
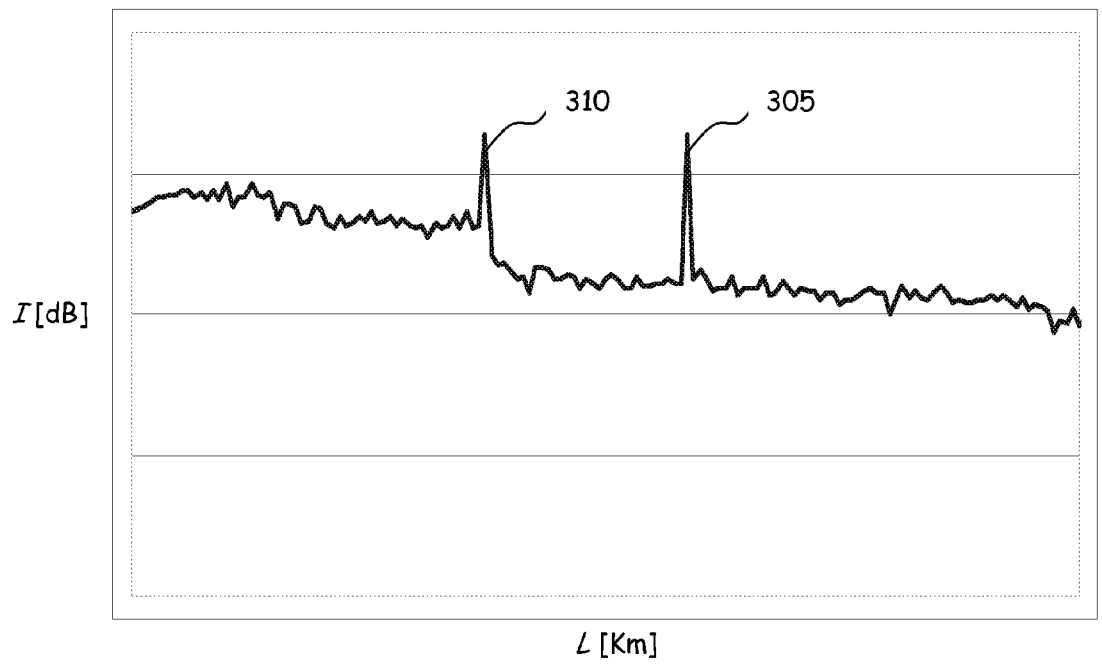

An example of a possible optical radiation reflection pattern detected by the monitoring unit 220 in a situation like this is depicted in FIG. 3B where, in addition to the peak 305, a second peak 310 in the reflected optical radiation pattern is visible, at the position, along the optical fiber 215, corresponding to the location of the SVL 205a along the cable 100, but slightly displaced compared to the peak 305, due to the difference in the optical paths followed by the two back-reflected optical radiations I1ar and I2ar. When such an optical radiation reflection pattern is detected, it is possible to assess that the SVL is experiencing a discharge event.

In case the SVL 205a breaks, e.g. blows, the length of optical fiber wound around the SVL 205a in the first optical branch breaks as well, and the spilled optical radiation fraction I1a no longer reaches the reflector 233a; thus, no optical radiation is reflected back by the first optical branch associated with the SVL 205a. Therefore, the peak 305 in the optical radiation reflection pattern detected by the central monitoring unit 220 disappears.

The breaking of the SVL may also cause a damage of the second optical branch and two possibilities exist.

A first possibility is that the second optical branch associated with the SVL 205a, particularly the optical shutter 235a, breaks in such a way that Fresnel reflection may take place where the optical fiber is broken. In this case, a non-negligible part I2ar of the spilled optical radiation fraction I2a is reflected back towards the second optical splitter 225a, which injects the back-reflected optical radiation I2ar into the optical fiber 215. In this case, a peak in the optical radiation reflection pattern is detected by the central monitoring unit 220.

Figure 3C:
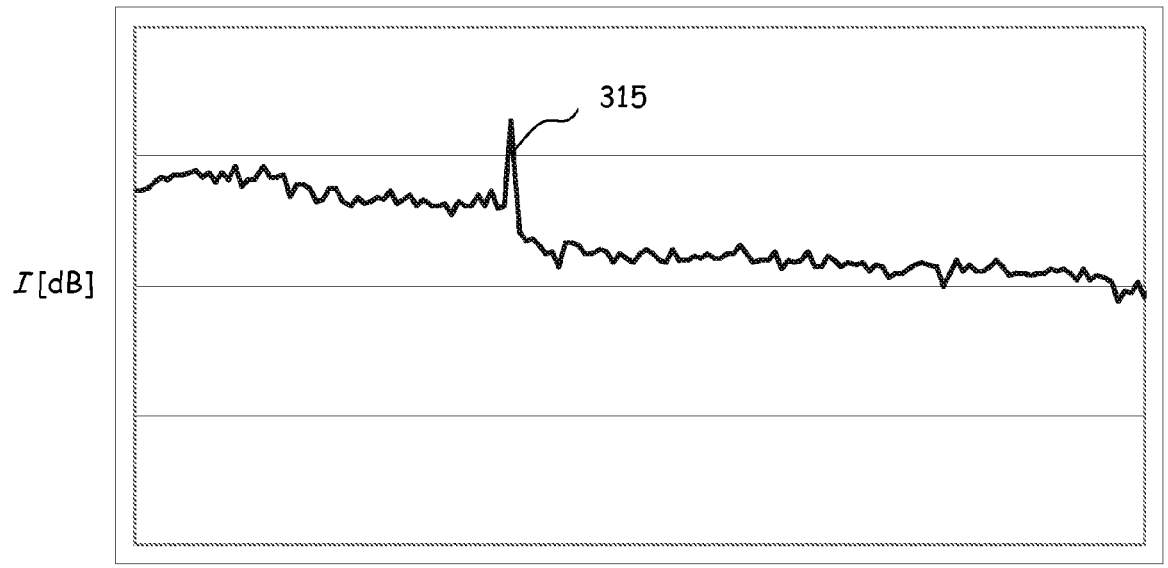

An example of a possible optical radiation reflection pattern detected by the monitoring unit 220 is depicted in FIG. 3C: a second peak 315 in the reflected optical radiation pattern is visible, approximately at the position, along the optical fiber 215, where the peak 310 in FIG. 3B was located.

A second possibility is that the second optical branch associated with the SVL 205a breaks in such a way that Fresnel reflection does not take place where the optical fiber is broken. In this case, the spilled optical radiation fraction I2a is not reflected back towards the second optical splitter 225a, thus no peaks in the optical radiation reflection pattern are detected by the central monitoring unit 220.

Figure 3D:
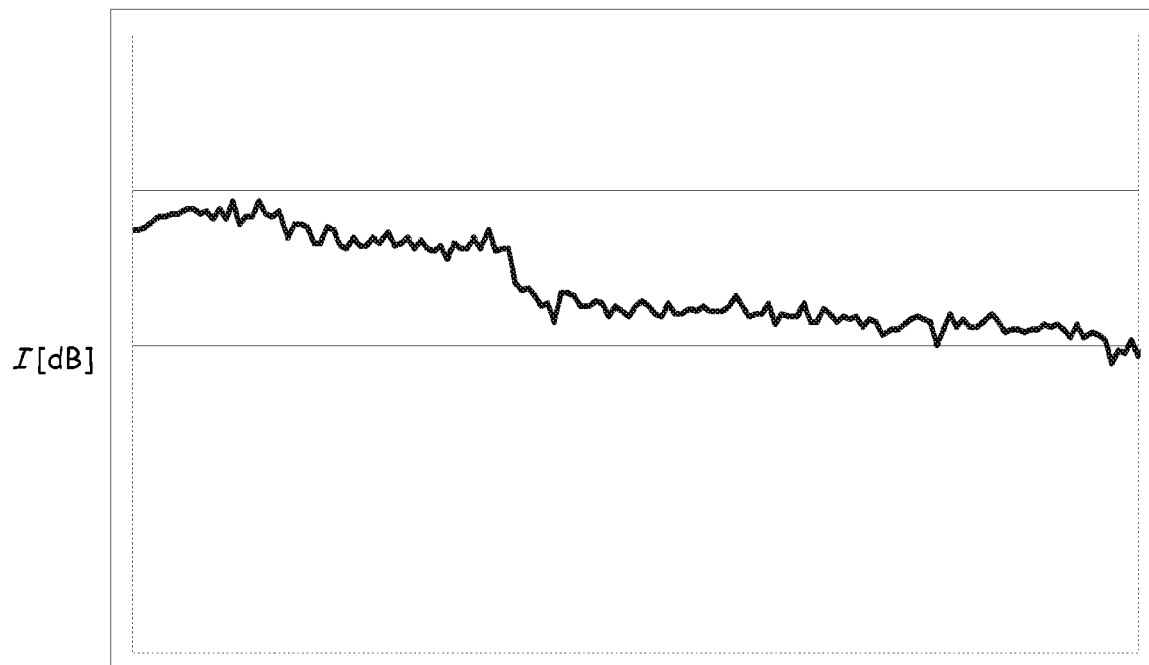

An example of a possible optical radiation reflection pattern detected in this case by the monitoring unit 220 is depicted in FIG. 3D.

In both these two cases, observation of the optical radiation reflection pattern allows assessing that the SVL 205a is broken and needs to be replaced.

Figure 4:
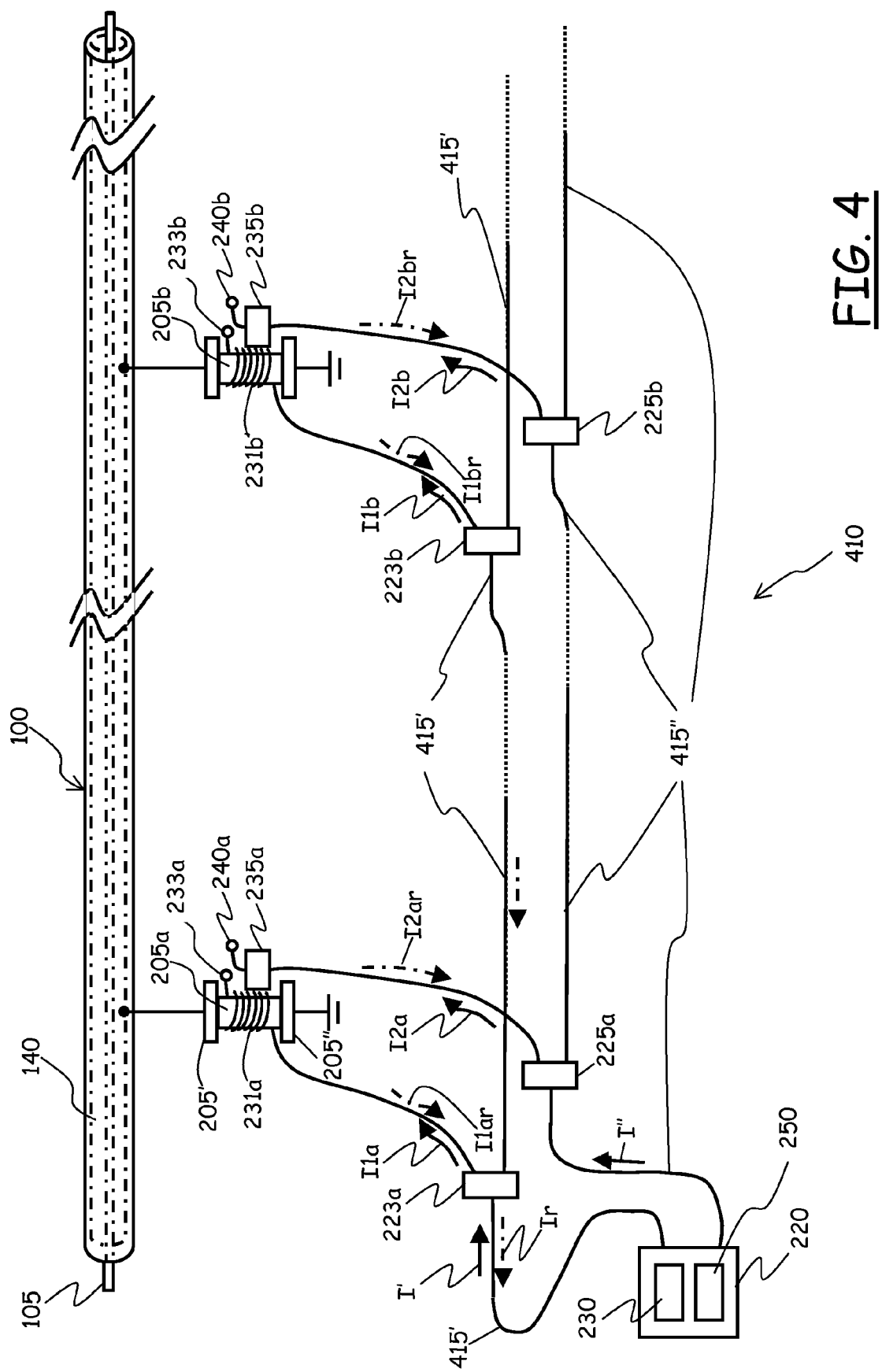
FIG. 4 schematically shows a monitoring system according to another embodiment of the present invention, still applied to the electric power distribution system for monitoring the SVLs protecting it.

In FIG. 4, a monitoring system 410 according to a further embodiment of the present invention is schematically depicted, which, similarly to the system of FIG. 2, is adapted to allow the remote monitoring of the state of the SVLs used to protect the cable 100. Elements of the monitoring system 410 which are identical or similar to those of the monitoring system 210, are denoted by same reference numerals.

The monitoring system 410 is, similarly to the monitoring system 210 of the previous embodiment of FIG. 2, a passive, optical-based system; differently from the monitoring system 210, the monitoring system 410 comprises a first and a second optical fiber 415' and 415" that, starting from the central monitoring unit 220, run along the cable 100. The first and the second optical fibers 415' and 415" may be optically coupled to each other at the central monitoring unit 220, so that a single optical source 230 and a single optical receiver 250 can be used. Alternatively, two optical sources and two optical receivers are used.

The first optical splitters 223a, 223b are provided, in correspondence of each SVL 205a, 205b, along the first optical fiber 415'. Similarly to the previously described embodiment, the first optical splitters 223a, 223b are designed to spill a respective, selected fraction I1a, I1b of the optical power of an optical radiation they receive in input, in particular a fraction of the optical power I' of a first optical radiation injected into the first optical fiber 415' by the optical source 230 of the central monitoring unit 220 and propagating along the first optical fiber 415'.

The fraction I1a, I1b of optical radiation spilled by the first optical splitter 223a, 223b is fed to a respective first optical branch, which, similarly to the previously described embodiment, comprises a respective length 231a, 231b of optical fiber which is mechanically coupled (attached) to the respective SVL 205a, 205b and which terminate with the respective first reflector 233a, 233b. Preferably, the lengths 231a, 231b of the optical fibers of the first optical branches are wound or wrapped around the respective SVL 205a, 205b.

The second optical splitters 225a, 225b are provided, in correspondence of each SVL 205a, 205b, along the second optical fiber 415". Similarly to the previously described embodiment, the second optical splitters 225a, 225b are designed to spill a respective, selected fraction I2a, I2b of the optical power of an optical radiation they receive in input, in particular a fraction of the optical power I" of a second optical radiation injected into the second optical fiber 415" by the optical source 230 of the central monitoring unit 220 and propagating along the second optical fiber 415".

The fraction I2a, I2b of optical radiation spilled by the second optical splitter 225a, 225b is fed to a respective second optical branch, which, similarly to the previously described embodiment, comprises an optical attenuator 235a, 235b and, downstream the optical attenuator 235a, 235b, a second reflector 240a, 240b. When the optical attenuator 235a, 235b is closed, it blocks the propagation of the optical radiation fraction spilled by the associated second optical splitter 225a, 225b, impeding the reflection of said radiation by the second reflector 240a, 240b.

As in the previously described embodiment, the optical attenuator 235a, 235b is operatively coupled to the respective SVL 205a, 205b in such a way as to be responsive to a change in a physical quantity associated with the SVL. The coupling can be thermal, electrical, magnetic or mechanical, or a combination thereof.

Similar considerations made in the description of the monitoring system 210 in respect of the optical splitters, the optical attenuators and the reflectors apply to the presently described embodiment.

The monitoring system 410 of this embodiment of the present invention operates in the following way.

The optical source 230 of the central monitoring unit 220 injects a first optical radiation I' into the first optical fiber 415', and a second optical radiation I" into the second optical fiber 415"; the first and second optical radiations I' and I" have selected wavelengths, possibly coinciding. The first optical radiation I' propagates through the first fiber 415', and the second optical radiation I" propagates through the second fiber 415".

When the first optical radiation I' propagating through the first optical fiber 415' reaches the first optical splitter associated with a corresponding SVL, like for example the first optical splitter 223a in correspondence to the SVL 205a, a selected fraction I1a of the first optical radiation is spilled and fed to the first optical branch associated with that SVL, while the remaining part of the optical radiation continues to propagate along the first fiber 415'. The same occurs at each SVL positioned along the cable length.

Similarly, when the second optical radiation I" propagating through the second optical fiber 415" reaches the second optical splitter associated with a corresponding SVL, like for example the second optical splitter 225a in correspondence to the SVL 205a, a selected fraction I2a of the second optical radiation I" is spilled and fed to the second optical branch associated with that SVL, while the remaining part of the second optical radiation I" continues to propagate along the second fiber 415". The same occurs at each SVL positioned along the cable length.

Considering one of the SVLs, e.g. the SVL 205a, the first optical branch is closed in normal conditions (when the SVL operates properly and it is not discharging an over-voltage of the metallic sheath 140 of the cable 100), i.e. it lets the spilled fraction I1a of optical radiation to pass, reach the first reflector 233a and be reflected back towards the first optical splitter 225a. On the contrary, the second optical branch is open in normal conditions (because the optical shutter 235a is normally open), i.e. it blocks the spilled fraction I2a of optical radiation, preventing it from reaching the reflector 240a.

In particular, as long as the considered SVL 205a is not damaged and does not conduct current, the spilled fraction of optical radiation I1a in the first optical branch reaches the first reflector 233a, where it is reflected back as a back-reflected optical radiation fraction I1ar towards the first optical splitter 223a, which injects the back-reflected optical radiation fraction I1ar into the first optical fiber 415'. The optical shutter 235a associated with the SVL 205a remains in the open state, so that the spilled fraction of optical radiation I2a is blocked, and no significant back-reflection takes place in the second optical branch. The back-reflected optical radiation fraction I1ar propagates through the first optical fiber 415' to the central monitoring unit 220, where it is received and detected by the optical receiver 250.

Figure 5A:
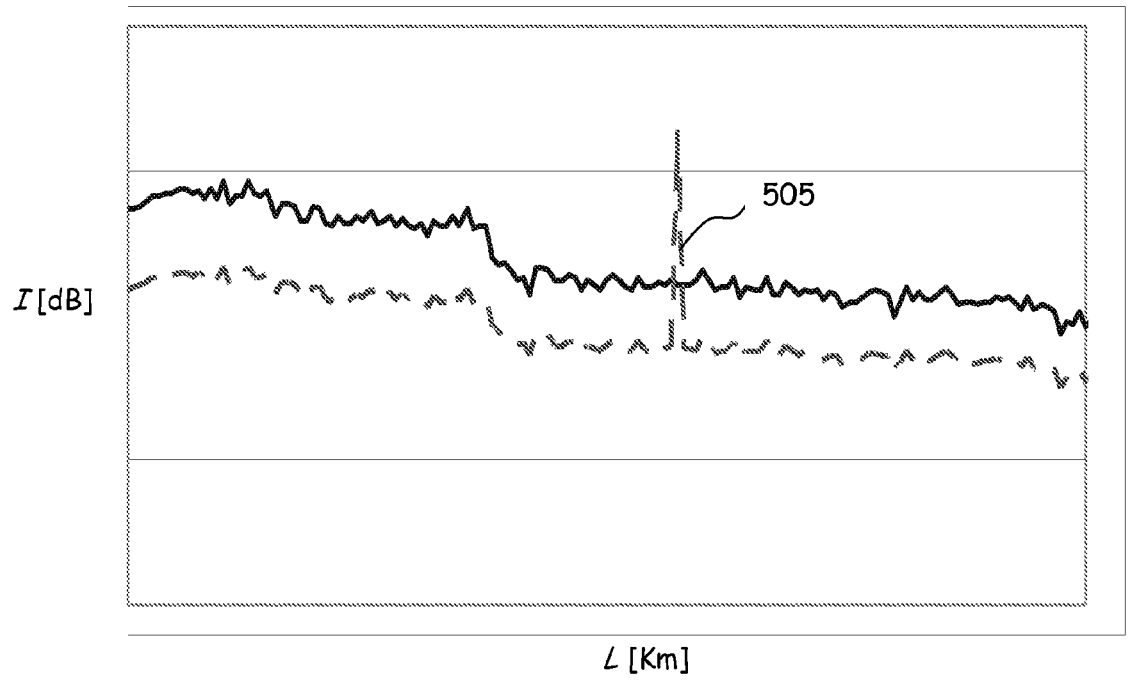
FIGS. 5A-5D are diagrams of different patterns of back-reflected optical radiations that can be detected by an optical receiver of the monitoring system of FIG. 4, adapted to identify different change of states of a monitored component.

An example of a possible optical radiation reflection pattern (reflected optical radiation intensity I, in dB, in ordinate versus distance L along the first optical fiber 415', in Km, in abscissa) detected by the monitoring unit 220 in the condition mentioned above is depicted in FIG. 5A where a peak 505 is visible in the optical radiation reflection pattern on the first optical fiber 415', at a position, along the first optical fiber 415', corresponding to the location of the SVL 205a along the cable 100. On the contrary, no peaks are detected in the optical radiation reflection pattern on the second optical fiber 415". When such an optical radiation reflection pattern is detected, the SVL is assessed to operate properly and no current discharge event is taking place.

In the case the SVL 205a conducts a current, for example because the SVL is discharging an over-voltage of the metallic sheath 140 of the cable 100 (in this case the SVL becomes conductive for a short transient, and a current burst flows therethrough, then the SVL returns to its non-conductive state), the rise in the SVL temperature due to the current flowing therethrough causes the optical shutter 235a to switch to the closed state, and the spilled optical radiation fraction I2a can thus propagate through the second optical branch and reach the second reflector 240a; here, a non-negligible part I2ar of the spilled fraction of optical radiation is reflected back towards the second optical splitter 225a, which injects the back-reflected optical radiation into the second optical fiber 415". Provided that the SVL 205 is not damaged or broken by the current burst flowing therethrough, the first optical branch (particularly, the length of optical fiber wound around the SVL 205a) is also not damaged, and continues to allow the spilled optical radiation fraction I1a reaching the first reflector 233a, where it is reflected back as a back-reflected optical radiation fraction I1ar towards the first optical splitter 223a, which injects the back-reflected optical radiation fraction I1ar into the first optical fiber 415'. The back-reflected optical radiation I1ar and the back-reflected optical radiation I2ar propagate back to the central monitoring unit 220 through the first and second optical fibers 415' and 415", respectively; at the central monitoring unit 220, the back-reflected optical radiations I1ar and I2ar are received and detected by the optical receiver 250.

Figure 5B:
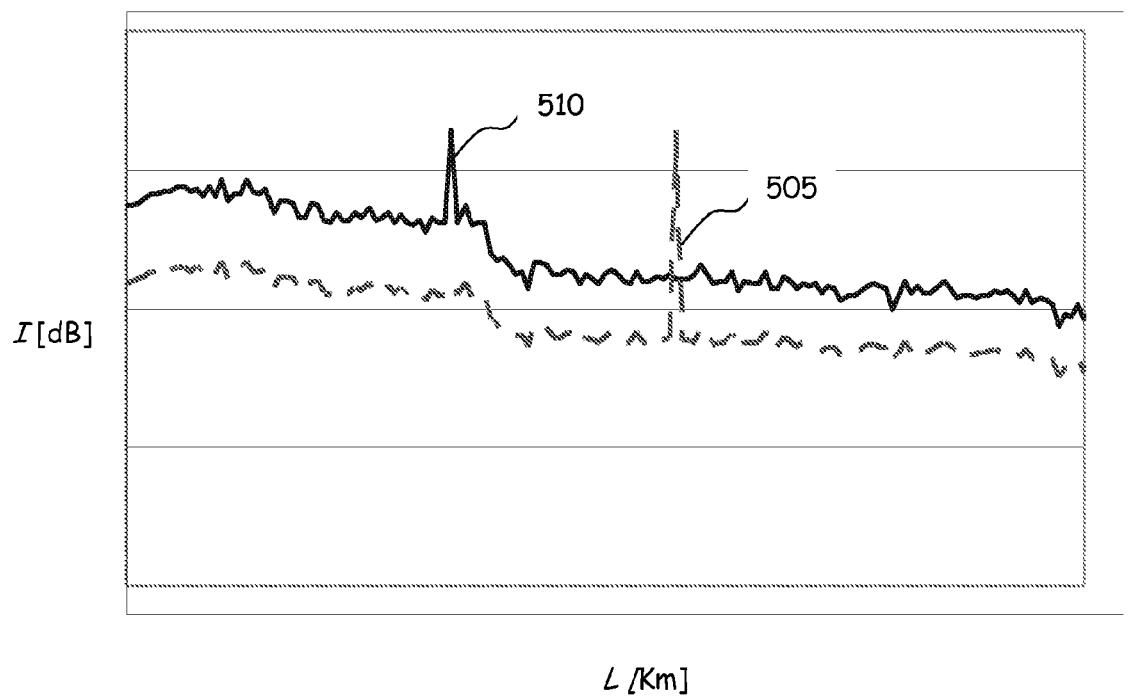

An example of a possible optical radiation reflection pattern detected by the monitoring unit 220 in a situation like this is depicted in FIG. 5B where, in addition to the reflection peak 505 on the first optical fiber 415', a reflection peak 510 on the second optical fiber 415" is visible, at the position, along the first optical fiber 415', corresponding to the location of the SVL 205a along the cable 100, but slightly displaced compared to the peak 505, due to the difference in the optical paths followed by the two back-reflected optical radiations I1ar and I2ar. When such an optical radiation reflection pattern is detected, it is possible to assess that the SVL is experiencing a discharge event.

In the case the SVL 205a breaks, the length of the optical fiber wound around the SVL 205a in the first optical branch breaks as well, and the spilled optical radiation fraction I1a no longer reaches the reflector 233a; thus, no optical radiation is reflected back by the first optical branch. The reflection peak 505 on the first optical fiber 415' disappears.

As described in the foregoing in connection with the monitoring system 210 of the previous embodiment, the breaking of the SVL may cause a damage of the second optical branch and two possibilities exist.

In the case the second optical branch, particularly the optical shutter 235a, breaks in such a way that Fresnel reflection may take place where the optical fiber is broken, a non-negligible part I2ar of the spilled optical radiation fraction I2a is reflected back towards the second optical splitter 225a, which injects the back-reflected optical radiation I2ar into the second optical fiber 415". In this case, a reflection peak on the second optical fiber 415" is detected by the central monitoring unit 220.

Figure 5C:
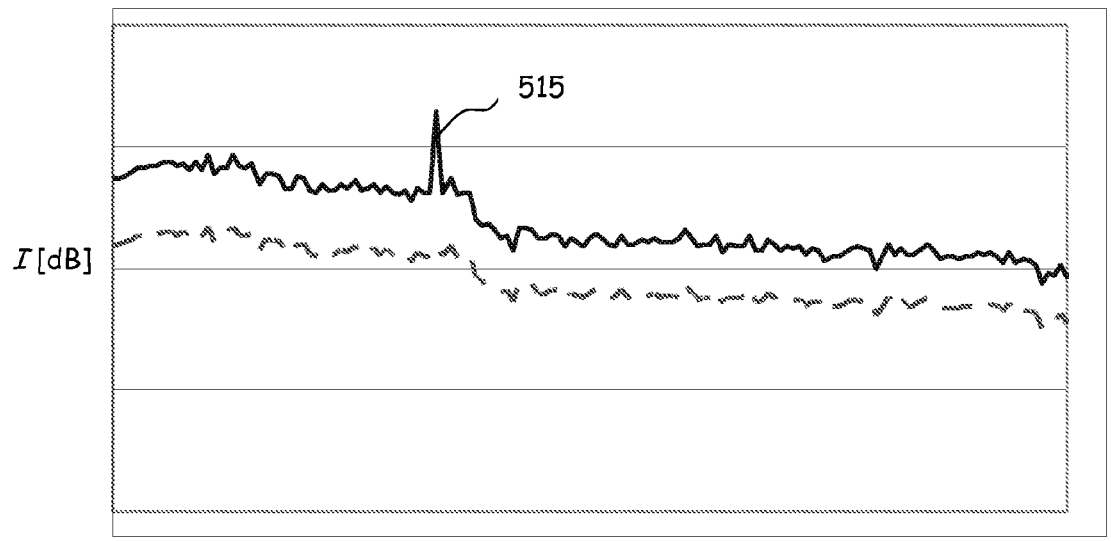

An example of a possible optical radiation reflection pattern detected by the monitoring unit 220 is depicted in FIG. 5C where a reflection peak 515 on the second optical fiber 415" is visible, approximately at the position, along the optical fiber, where the peak 510 in FIG. 3B was located.

Figure 5D:
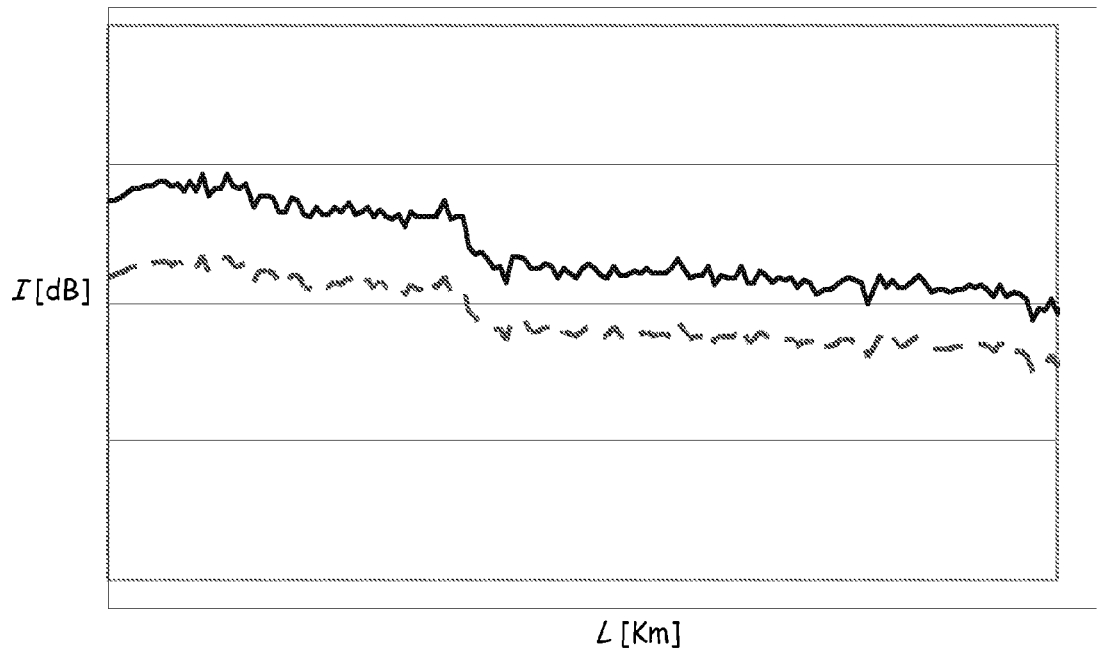

On the contrary, in the case the second optical branch breaks in such a way that Fresnel reflection does not take place where the optical fiber is broken, the spilled optical radiation fraction I2a is not reflected back towards the second optical splitter 225a, thus no peaks in the optical radiation reflection pattern are detected by the central monitoring unit 220 on the second optical fiber 415". An example of a possible optical radiation reflection pattern detected by the monitoring unit 220 is depicted in FIG. 5D.

In both these two cases, observation of the optical radiation reflection pattern on the first and second optical fibers 415' and 415" allows assessing that the SVL 205a is broken, and needs to be replaced.

The embodiment according to which first and second optical fibers 415' and 415" are provided and said optical fibers are not optically coupled to each other at the central monitoring unit 220 is particularly preferred. In fact, according to this specific embodiment, the monitoring system can easily assess the operating conditions of the monitored SVLs.

However, in alternative embodiments of the invention, the first and the second optical fibers 415' and 415" may be optically coupled to each other at the central monitoring unit 220, so that a single optical source 230 and a single optical receiver 250 can be used.

Depending on the nature of the optical receiver 250 in the central monitoring unit 220, different characteristics of the back-reflected optical radiation can be detected, particularly, either intrinsic characteristics of the optical radiation or characteristics imparted to the back-reflected optical radiation by the optical attenuator and/or the reflector.

For example, the central monitoring unit 220 may comprise an OTDR apparatus, which is used as both optical source 230 and optical receiver 250. As known in the art, an OTDR apparatus is an optoelectronic instrument that is often used to characterize optical fibers. The OTDR apparatus is configured to inject a series of optical radiation pulses into the optical fiber 215, or into the first and second optical fibers 415' and 415". The optical radiation pulses propagate through the optical fiber 215, or through the first and second optical fibers 415' and 415"; the optical radiation is reflected back from points in the optical fiber where, due for example to fiber dishomogeneity, the index of refraction changes. The intensity of the return pulses is measured and integrated as a function of time, and is plotted, e.g. on a display device, as a function of fiber length.

Using an OTDR apparatus the characteristic that allows determining the position of the SVL may be the change in time of the intensity of back-reflected optical radiation. In particular, with an OTDR apparatus the position, along the optical fiber 215 or along the first and second optical fibers 415' and 415" (and thus along the cable 100), of the SVL that experienced a change of state results from the position where a reflection peak in the reflection pattern appears/disappears.

As an alternative to the OTDR apparatus, that generates optical radiation pulses, a Correlation OTDR apparatus (COTDR) can be used. As known to those skilled in the art, a COTDR apparatus generates a series of optical radiation pulses and correlates them with the back-reflected optical radiation.

As an alternative to the use of an OTDR or a COTDR, an OSA may be used, in combination with the provision, in the first and second optical branches that are associated with different SVLs, of wavelength-selective optical components. For example, in the first and second optical branches that are associated with an SVL, a filter may be associated with the first and second reflectors, so as to allow back-reflection of optical radiation at a selected wavelength, corresponding to that SVL. Thus, the back-reflected optical radiation coming from different SVLs is characterized by a different wavelength, and the OSA can discriminate among the different SVLs based on the different wavelength of the back-reflected optical radiation. The filter may be optical fiber gratings, designed to selectively reflect optical radiation at different wavelengths depending on the SVL, which are used to form the first and second reflectors instead of using high-reflectivity pigtails.

Figure 6:
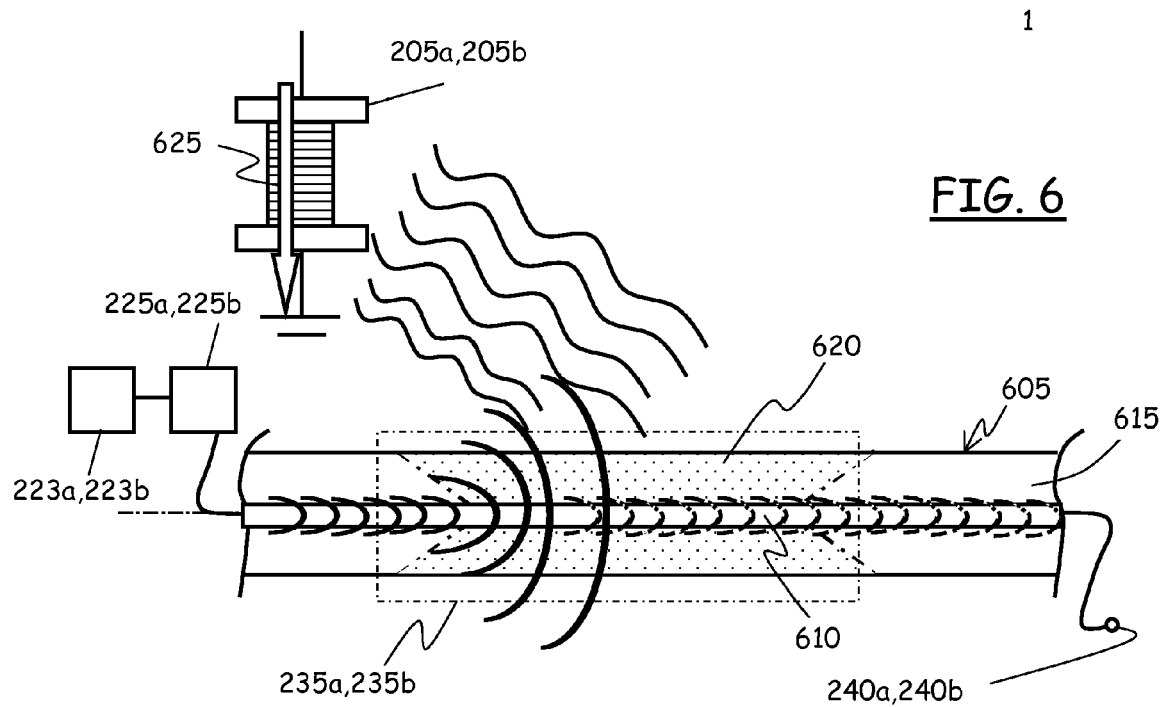
FIG. 6 schematically shows an optical attenuator than can be used in the monitoring system according to an embodiment of the present invention.

The optical attenuators 235a, 235b in the second optical branches that are associated with the SVLs may be passive thermal optical attenuators. In FIG. 6 a possible embodiment of a passive thermal optical attenuator is schematically depicted, being an all-fiber, "evanescent field" device. The device comprises an optical fiber 605, with a fiber core 610 surrounded by a cladding 615 having refraction index lower than that of the core 610 exception made for a portion 620, made of a suitable polymer, for example a photopolymer marketed by DuPont de Nemours, providing the cladding with a refraction index variable with the temperature, and particularly in such a way that, at room temperature (e.g., 25° C.) the refraction index is higher than that of the core 610, while for higher temperatures the refraction index decreases. The fiber 605, particularly the portion 620 thereof, is in thermal coupling with the respective SVL 205a, 205b, for example by physical direct contact. When the SVL does not conduct current, its temperature is relatively low (it is substantially at the room temperature), so the cladding portion 620 has a refraction index higher than that of the core 610 and the optical fiber 605 does not guide any longer the optical radiation coming from the second optical splitter 225a, 225b, which is thus dispersed and does not reach the second reflector 240a, 240b. When, on the contrary, the SVL conducts a current 625, the heat generated by Joule effect causes the temperature of the optical fiber 605 to increase, so that the refraction index of the polymeric cladding portion 620 lowers below that of the core 610; the optical radiation coming from the second optical splitter 225a, 225b can thus pass through the optical attenuator 235a, 235b and reach the second reflector 240a, 240b, where it is reflected back.

Using the thermal optical attenuator, an OTDR or COTDR apparatus at the central monitoring unit 220 is capable of identifying which of the SVLs conducts current, or is broken, based on the determination of the location of the peak in the intensity of the back-reflected optical radiation; using an OSA, in combination with optical filters inserted in the first and second optical branches, the SVL can be identified based on the wavelength of the back-reflected optical radiation. Using an OTDR or COTDR apparatus, or an OSA, it is also possible to "count" the number of discharge events individually sustained by each of the SVLs, by counting the number of times the reflection peak 310 or 510 appears. In this way it is possible to perform a preventive maintenance of the SVLs: when an SVL approaches the maximum number (typically, eight-ten) of discharges that it can sustain without breaking, it is scheduled for replacement.

Other types of optical attenuators can be used as an alternative to thermal optical attenuators, for example optical attenuators based on the electro-optic or magneto-optic effect, or mechanical shutters. Also, two or more different types of optical attenuators may be combined: for example, a thermal optical attenuator may be used in conjunction with an electro-mechanical optical attenuator. More generally, any component adapted either to attenuate and/or to block an incident optical radiation, or to let it pass through, can be used.

The optical splitters 223a, 223b, 225a, 225b may have coincident splitting ratio, or, alternatively, each optical splitter may have a peculiar splitting ratio. For example, the splitting ratio of the optical splitters close to the central monitoring unit 220 may be lower than that of the optical splitters located far away from it, so that the peaks in the back-reflected optical radiation intensity corresponding to the SVLs closer to the central monitoring unit 220 are lowered. For example, the optical splitter farthest from the central monitoring unit 220 can have a 50/50 split ratio, whereas the other splitters can have a 20/80 split ratio. In particular, the split ratio may depend on the reflectivity of the reflectors 233a, 233b, 240a, 240b. For example, in case of simple Fresnel reflection at a cut optical fiber edge, the split ratio (i.e., the amount of spilled optical radiation) should be increased, whereas the use of a high-reflectivity pigtail allows reducing the split ratio. The fraction of optical radiation that is spilled at each optical splitter may decrease monotonically while moving away from the optical source. Also, in order to adjust (reduce) the intensity of the optical radiation that is back-reflected by each reflector 233a, 233b, 240a, 240b, an optical fiber loop may be provided before the reflector: by changing the bending radius of the fiber loop, the optical losses are increased/decreased.

Figure 7:
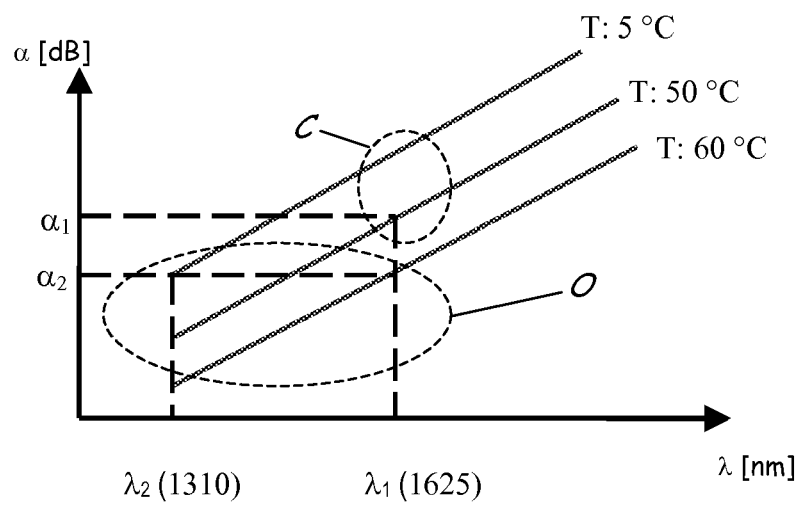
FIG. 7 is a schematic diagram showing the variation of the attenuation of an exemplary Variable Optical Attenuator (VOA) that can be used as an optical shutter in the monitoring system of FIG. 2 or 4.

It is also possible to remotely assess the integrity of the monitoring system itself. Indeed, should the optical fiber 215, or the first and second optical fibers 415' and 415", or the fibers in the second optical branches downstream the second optical splitters associated with every SVL be damaged or broken (an event that is not very unlikely, especially when the electric power distribution networks are placed in underground tunnels shared by different distribution systems, like telephone networks, gas and the like, thus people unskilled in this specific field may have access), with the consequence that the operation of the monitoring system is compromised. Using an OTDR or a COTDR apparatus at the central monitoring unit 220 allows assessing the optical fiber integrity and, in case of break, to identify the position of the break. It is pointed out that in principle this OTDR or COTDR apparatus used to monitor the integrity of the monitoring system may be distinct from the optical receiver 250 used to monitor the ancillary elements of the electric power distribution line, however it is expedient to use the same instrument for both purposes. In particular, optical radiations at different wavelengths may be used for monitoring the ancillary elements of the electric power distribution line and the integrity of the monitoring system itself. For example, let it be assumed that evanescent-field VOAs are used for implementing the optical attenuators 235a, 235b. Referring to FIG. 7 (which is a diagram with the attenuation α, units [dB], in ordinate, and the wavelength λ, units [nm], in abscissa), the VOA behaves as a temperature sensor that, at a selected first operating wavelength $\lambda_1$, e.g. approximately 1625 nm, stays "closed" (a condition, denoted C in the drawing, corresponding to a high attenuation, greater than a first attenuation value $\alpha_1$) as long as the external temperature is below approximately 50° C., and "opens" (i.e., its attenuation becomes lower than a second attenuation value $\alpha_2$ lower than the first attenuation value $\alpha_1$; in the drawing the open condition is denoted O) when the external temperature raises above approximately 60° C. Let it be assumed that the first operating wavelength $\lambda_1$ is used to monitor the operating condition of the SVLs. The integrity of the monitoring system can be monitored, even when the VOA is closed at the first wavelength $\lambda_1$, provided that an optical signal at a second wavelength $\lambda_2$, lower than the first wavelength, is used (e.g., approximately 1310 nm), at which the VOA exhibits a relatively low attenuation, below the second attenuation value $\alpha_2$, even at low external temperatures (as low as 5° C., in the example shown in the drawing). Thus, even when the VOA does not allow the optical radiation at the first wavelength to pass and reach the reflector 240a, 240b, the optical radiation at the second wavelength passes, reaches the reflector 240a, 240b, is reflected back, and thus the OTDR detects peaks in the back-reflected optical radiation at the second wavelength in positions corresponding to the ancillary elements, and this provides an indication of the system integrity; when instead one or more of said peaks are not detected, this means that the system integrity has been compromised.

Although in the preceding description only one cable 100 has been considered, typically, in an electric power distribution network, three cables run in parallel, for transporting the three electrical phases; thus, at more or less regularly spaced locations along the cables, clusters of three ancillary elements such as SVLs are provided, relatively close to each other, for example enclosed in a box. Three distinct monitoring systems of the type shown in FIG. 2 or in FIG. 4 can be used to monitor the SVLs of each of the three cables. However, it is also possible to use a monitoring system having a single central monitoring unit, and three optical fibers, or three pairs of optical fibers, running along the three cables and coupled together by a coupler. As a further alternative, a single optical fiber, or a single pair of optical fibers, can be used, and different first and second optical branches (i.e., different optical splitters, optical attenuators and reflectors) may be provided for each SVL in a cluster; this allows monitoring the SVLs of the cluster individually. Should the physical distance of the SVLs in a cluster (normally of some meters) not be sufficient for the OTDR or COTDR apparatus to discern, fiber spools of different length may be provided in the optical branches to vary the positions of the peaks in the back-reflected optical radiation intensity detected by the OTDR or COTDR apparatus.

Thanks to the present invention, it is possible to monitor the operating condition of ancillary elements spread along an electric power distribution line, and identify which ancillary element is experiencing a physical event on the cable or is broken or near to be broken; the maintenance operations of the electric power distribution network are thus performed when they are really necessary, and in a more efficient way, so that any possible service interruption is reduced in time and frequency. Furthermore, the present invention may even be used to set up a preventive maintenance schedule, aimed at replacing or restoring the ancillary elements before they actually break, when they approach the average maximum operating life.

The monitoring system of the present invention is completely passive, can be activated by a physical phenomenon generated by, for example, a surge or fault or disturbance, with no need of other external energy feed such as batteries or the like.

The centralized character of the central monitoring unit, that can be located remotely from the electric power distribution line, i.e. not on the field, makes the maintenance of the optical source easy.

The present invention has been here described considering some exemplary embodiments thereof, however those skilled in the art will appreciate that several modifications to the described embodiments, as well as different embodiments of the invention are possible, for example in order to meet contingent needs.

For example, although reference has always been made to the monitoring of SVLs, the present invention has more general applicability, and can be used to monitor any ancillary component of an electric power distribution line, like for example cable joints. More generally, the present invention can be used to monitor components of any nature (for example, electric motors) located in different positions.

The monitoring system of the present invention can make use of any suitable kind of optical fiber, for example, polymeric, polymer-cladded, single mode or multimode. The selection of a specific type of optical fiber can be made by the skilled in the art on the basis of the specific application.

Depending on the specific application and on the physical shape of the components to be monitored, suitable adapters may be devised to allow wrapping—around the component to be monitored—the length of optical fiber of the first optical branch, without excessively bending the fiber, as well as to apply to the component the optical attenuator in the second optical branch. A suitable adapter can be in the form of a container which surrounds and envelops the component to be monitored, thereby providing a safe and proper seat for the optical fiber and the optical fiber components (e.g. an optical attenuator).

The invention claimed is:

1. A system for monitoring a plurality of components distributed in different space locations, comprising:
   at least one optical fiber path;
   an optical radiation source capable of being adapted to inject optical radiation into the at least one optical fiber path;

at least one first and at least one second optical branches branching from the at least one optical fiber path and capable of being adapted to spill respective portions of said optical radiation, the first and second optical branches capable of being adapted to operatively associate with a respective component to be monitored, wherein:
the first optical branch comprises:
a first optical reflector and is capable of being adapted to reflect the spilled optical radiation portion, unless the respective component at least partially breaks; and
a length of optical fiber capable of being wrapped around the respective component to be monitored;
the second optical branch comprises:
at least one passive optical attenuator capable of being adapted to operatively couple to the respective component to be monitored, and having an attenuation capable of changing in response to a change in operating conditions of the respective monitored component when operatively coupled thereto, and
a second optical reflector; and
an optical receiver capable of being adapted to detect back-reflected optical radiation reflected by said first and second optical branches.

2. The monitoring system of claim 1, wherein said optical attenuator is capable of being adapted to attach to the respective component to be monitored.

3. The monitoring system of claim 1, wherein said monitoring system is capable of being adapted to recognize a position of a component of said plurality of components by means of the optical receiver.

4. The monitoring system of claim 1, wherein characteristics of the back reflected optical radiation comprise a variation in time of intensity of the back-reflected optical radiation, a spectrum of the back-reflected optical radiation, a propagation delay of the back-reflected optical radiation to reach the optical receiver, and a polarization state of the back-reflected optical radiation.

5. The monitoring system of claim 1, wherein said components comprise ancillary elements of an electric power distribution network, said ancillary elements comprising at least one component selected from surge voltage limiters, thermometers, and pressure monitors.

6. The monitoring system of claim 1, wherein said passive optical attenuator is responsive to a current flowing through the component to be monitored.

7. The monitoring system of claim 1, wherein said respective portions of said optical radiation that are spilled by each first and second optical branches vary monotonically along the optical fiber path.

8. The monitoring system of claim 1, wherein said passive optical attenuator is thermally coupled to the respective component to be monitored.

9. The monitoring system of claim 8, wherein said passive optical attenuator has an attenuation varying with temperature, in such a way that a temperature increase caused by current flowing through the component to be monitored causes a change in the attenuation value.

10. A method of monitoring a plurality of components distributed in different space locations, comprising:
providing at least one optical fiber path;
associating each of the components to be monitored with respective at least one first and second optical branches branching from the at least one optical fiber path, capable of being adapted to spill respective portions of an optical radiation propagating through the at least one optical path, wherein the first optical branch is capable of being adapted to reflect the spilled optical radiation portion, unless the respective component at least partially breaks, and wherein associating each of the components to be monitored to the respective at least one first optical branch comprises wrapping a length of optical fiber around the respective component to be monitored;
propagating the optical radiation into the optical fiber path;
operatively coupling at least one passive optical attenuator with each one of the components to be monitored, the passive optical attenuator being part of the second optical branch associated with the respective component;
responsive to a change in operating condition of at least one of the components to be monitored, causing a spilled optical radiation propagating through the second optical branch associated with said component to be back-reflected;
detecting back-reflected optical radiation; and
recognizing a position of said at least one of the components based on a characteristic of the detected back-reflected optical radiation.

11. The monitoring method of claim 10, wherein operatively coupling at least one passive optical attenuator to each of the components to be monitored comprises attaching the passive optical attenuator to the respective component to be monitored.

12. The monitoring method of claim 10, wherein the characteristics of the back reflected optical radiation comprise a variation in time of intensity of the back-reflected optical radiation, a spectrum of the back-reflected optical radiation, a time interval necessary to the back-reflected optical radiation to reach the optical receiver, and a polarization state of the back-reflected optical radiation.

13. The method of claim 10, wherein said at least one passive optical attenuator has an attenuation variable between at least one first, higher value and one second, lower value responsive to operating conditions of at least one of the components to be monitored.

14. The method of claim 10, wherein said components to be monitored comprise ancillary elements of an electric power distribution network, said ancillary elements comprising at least one element selected from surge voltage limiters, thermometers, and pressure monitors.

15. The method of claim 10, wherein said passive optical attenuator is responsive to a current flowing through the ancillary element operatively coupled thereto.

16. The method of claim 10, wherein a fraction of optical radiation that is spilled by each of the first and second optical branches varies monotonically along the optical fiber path.

17. The method of claim 10, wherein operatively coupling comprises thermally coupling.

18. The method of claim 17, wherein said passive optical attenuator has an attenuation varying with temperature, in such a way that a temperature increase caused by current flowing through the component operatively associated therewith causes a change in the attenuation value.

* * * * *